O. A. PETERSON AND O. M. BRANCEL.
VULCANIZING TOOL.
APPLICATION FILED FEB. 18, 1920.
1,344,313.
Patented June 22, 1920.
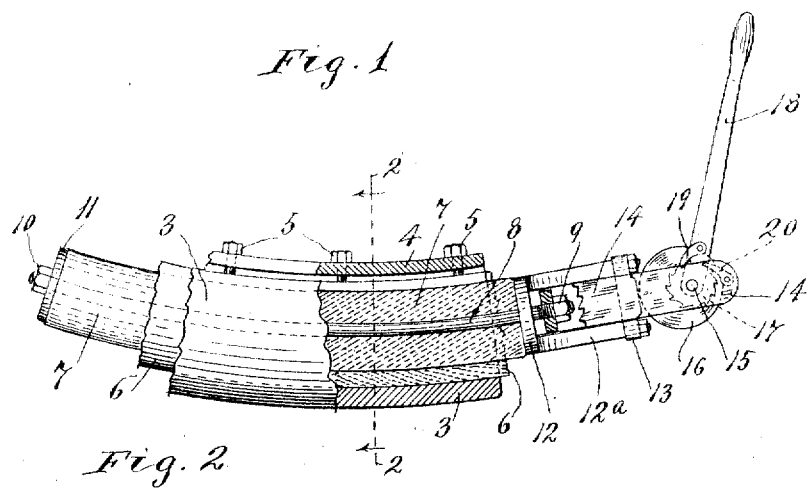
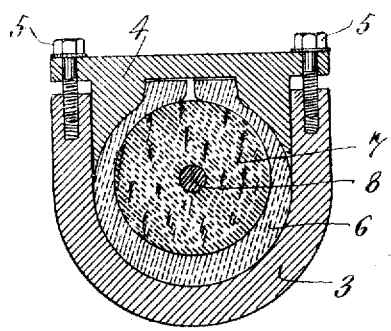
Inventors.
Oscar A. Peterson
Orville M. Brancel
By their Attorneys

UNITED STATES PATENT OFFICE.

OSCAR A. PETERSON AND ORVILLE M. BRANCEL, OF MINNEAPOLIS, MINNESOTA.

VULCANIZING-TOOL.

1,344,313.  Specification of Letters Patent.  Patented June 22, 1920.

Application filed February 18, 1920. Serial No. 359,729.

*To all whom it may concern:*

Be it known that we, OSCAR A. PETERSON and ORVILLE M. BRANCEL, citizens of the United States, residing at Minneapolis, in the county of Hennepin and State of Minnesota, have invented certain new and useful Improvements in Vulcanizing-Tools; and we do hereby declare the following to be a full, clear, and exact description of the invention, such as will enable others skilled in the art to which it appertains to make and use the same.

Our invention relates to vulcanizing tools of the type used to vulcanize linings, inner or outer patches or sections, to casings of pneumatic tires, and provides, as a novel feature, an improved form of expander for pressing the casing against the exterior metallic form of the vulcanizer.

Hitherto it has been a common practice to use an air inflated inner tube to expand the casing against the form during the process of vulcanizing the patch or liner to the interior of the casing by heat applied to the exterior of the metallic form. The form generally used is, as well known, a longitudinally curved cast iron channel provided with an adjustable clamping bar applied to the edges of its flanges.

The body of my improved expander is made of solid, but soft rubber or similar elastic material that may be expanded diametrically by endwise compression; and to thus expand the core diametrically by endwise compression, I extend a rod through the said core, apply clamping heads to the ends of the core, and further provide means for coaction with the rod and clamping heads to compress the core endwise and expand the same readily.

The invention is illustrated in the accompanying drawings wherein like characters indicate like parts throughout the several views. Referring to the drawings:

Figure 1 is a view partly in side elevation and partly in vertical axial section showing the improved expansible core and illustrating the use thereof in connection with a vulcanizing device of the character above stated, some parts being broken away; and Fig. 2 is a section on the line 2—2 of Fig. 1.

The channel shaped metal form is indicated by the numeral 3 and its clamping bar by the numeral 4, the latter being attached to the flange of the former by machine screws 5, the said parts being of well known construction. The tire casing is indicated by the numeral 6. The solid soft rubber core is indicated by the numeral 7 and the rod which is extended axially through, is indicated by the numeral 8; this rod, at its ends, is threaded and provided by nuts 9 and 10. A clamping head 11 of disk-like form is interposed between the nut 10 and the adjacent end of the core 7. The numeral 12 indicates a disk-like clamping head pressed against the opposite end of core 7 and through which the rod 8 is passed. The clamping head 12 is provided with vertically spaced outwardly projecting arms 12ª, the outer end of which is connected by a cross-bar 13. The numeral 14 indicates a U-shaped yoke that embraces a cross-bar 13 with its transverse inner portion working between the arms 12ª and engaged by the nut 9, the adjacent threaded end of the rod 8 being passed therethrough.

The numeral 15 indicates a short shaft journaled in the arms of the yoke 14 and provided between the said arms with an eccentric cam 16 and small ratchet wheel 17.

The numeral 18 indicates a small lever pivoted on the shaft 15 and provided with a driving pawl 19 that operates on the ratchet wheel 17. The numeral 20 indicates a retaining dog pivoted to the arms of the yoke 14 and also operative on the ratchet wheel 17.

The cam 16 engages directly with the cross-bar 13 so that the latter serves as an abutment to force the head 12 to the left against the right-hand end of the core 7 and to cause the said cam, when rotated, to pull the yoke 14 toward the right and through the rod 8, to pull the head 11 against the left-hand end of the core 7, thereby compressing said core endwise.

The use of the expander or expanding core is as follows: When the patch or liner has been placed in the casing and the casing has been placed in the form 3, the expanding core 7, while in normal condition, that is, while relieved from endwise compression, is placed within the casing and then the clamping bar 4 is applied as shown in the drawings.

When the cam 16 is rotated approximately 180 degrees from the position shown in Fig.

1, the core 7 will be free from endwise compression and will then have its smallest diameter so that it is adapted for application to or removable from the casing, but when the said cam is moved to, or approximately to, the position shown in Fig. 1, tension applied through the rod 8 will move the clamping heads 11 and 12 toward each other, thereby, putting the core 7 under endwise compression and causing the same to expand radially, so that it will then not only tightly press the casing against the form, but will fill up all spaces and thereby insure the desired pressure required in the vulcanizing action.

The cam 16 is adapted to be moved step by step by oscillatory movement by the pawl-equipped lever 18 and the retaining dog will, of course, hold the cam and ratchet wheel against backward rotation. The amount of pressure put upon the core may be varied by the amount of compression given same, and it is important to note that this compression may be varied by adjustments by the nuts 9 or 10, or both. For instance, the said cam may be so adjusted that the core 7, when relieved by pressure, expanded from the cam 16 on the cross-bar 13, will be under normal compression, and, hence, slightly expanded; and when this is the case it of course follows, that when the cam is brought into action, the core will be compressed endwise to a greater extent and will be expanded radially to a greater extent than when expanded as first described. Thus, a single core may be used in casings the interiors of which vary considerably in internal diameter.

The cam can be released and returned to normal position by throwing the retaining dog out of action or may be restored to normal position by continuing its forward movement until it is returned to such a position of 180 degrees, beyond that shown in Fig. 1.

What we claim is:

1. In a tire vulcanizing tool, an expander comprising a core of elastic material that will expand radially under endwise compression, and means for compressing said end core endwise to thereby expand the same radially.

2. In a tire vulcanizing tool, an expander comprising a solid core of soft rubber, clamping heads applied to the ends of said core, a rod extended axially through said core, attached to one of said clamping heads extended freely through the other clamping head, and a tension device applied to the latter noted clamping head and to the adjacent projecting end of said rod and operative thereon to compress said core endwise and thereby radially expand the same.

3. In a tire vulcanizing tool, an expander comprising a solid core of rubber, clamping heads applied to the ends of said core, a rod extended axially through said core and anchored to one of said heads, at one end, and at its other end extended freely through the other clamping head, adjustable means applied to said rod for varying the normal endwise compressing action of said heads on said core, and means operative on said rod and on one of said heads to compress said core endwise and radially expand the same.

4. In a tire vulcanizing tool, an expander comprising a solid core of soft rubber, clamping heads applied to the ends of said core, a rod extended axially through said core and anchored to one of said heads, at one end, and at its other end extended freely through the other clamping head, adjustable means applied to said rod for varying the normal endwise compressing action of said heads on said core and means operative on said rod and on one of said heads to compress said core endwise and radially expand the same, said latter means comprising a lever actuated cam and coöperating abutment.

In testimony whereof we affix our signatures.

OSCAR A. PETERSON.
ORVILLE M. BRANCEL.